2,856,387

POLYAMIDES AND PROCESS FOR PREPARING POLYAMIDES FROM ALKYL SUBSTITUTED DIAMINES AND ESTERS OF DICARBOTHIOLIC ACID

Henning Waldemar Jacobson, Elmore Louis Martin, and William Henry Sharkey, Wilmington, Del., assignors to E. I. du Pont de Nemours & Company, Wilmington, Del., a corporation of Delaware No Drawing. Application July 12, 1954
Serial No. 442,908

9 Claims. (Cl. 260—78)

This invention relates to polymeric materials and to the preparation of same and, more particularly, to polyamides.

Because of their many remarkable properties, the polyamides have attained, in a relatively short time, a high place industrially. This industrial importance is the result of the unique combination of properties which the polyamides possess, namely, high strength, good resistance to abrasion, and outstanding flex life. However, in applications involving sunlight exposure, it has not been possible to realize the full industrial potential of the polyamides because of their deficient light stability. Applications in which this deficiency is manifest include awnings, flexible auto top decking, tentage, tobacco shade cloth, and the like.

Diamines which have no free hydrogen atoms on the carbons vicinal to the nitrogen atoms are susceptible of amidation. This information has not been of practical value because attempts to employ such diamines in the preparation of polyamides by conventional methods, such as, heating the salt of the diamine and a dibasic acid, or by heating together a mixture of the diamine and an ester of the dibasic acid, has led to only polyamides which are too low in molecular weight for use in the industrially important applications.

An object of the present invention is to provide new polyamides and a process of preparing same. A further object is to provide such new polyamides which are tough and characterized by greatly improved light stability. A still further object is to provide such polyamides of sufficiently high molecular weight to be well adapted for use in textiles and other industrially important applications. Other objects will be apparent from the description of the invention given hereinafter.

The above objects are accomplished according to the present invention by providing new polyamides having an inherent viscosity of at least 0.75 and essentially comprising the condensation reaction product of alpha,alpha'-tetraalkyl-substituted diamines containing at least one hydrogen on each amino group and esters of dicarbothiolic acids in which the carbothiolic acid groups are separated by a chain of 3 to 10 carbons, inclusive. The invention further comprises the process of preparing such polyamides by reacting the above characterized diamines and esters at a temperature of 50° C. to 325° C. and, preferably, at a temperature of 200° C. to 275° C., until a polyamide having an inherent viscosity of at least 0.75 is formed.

Inherent viscosities are given throughout the specification and claims as measured at 25° C. on a 0.5% solution of the polyamide in m-cresol.

The diamines used in the preesnt invention belong to that class of diamines having no free hydrogen atoms on the carbons vicinal to the nitrogen atoms and which give polyamides. But whereas such diamines had heretofore only given polyamides of such low molecular weight as to have only limited value, it has now been discovered that the alpha,alpha'-tetraalkyl-substituted diamines containing at least one hydrogen on each amino group, will readily react with esters of dicarbothiolic acids in which the carbothiolic acid groups are separated by a chain of from 3 to 10 carbon atoms, to give high molecular weight polyamides having both greatly improved light stability and toughness adapting them for use in a wide variety of important practical applications. Insofar as known, the formation of these high molecular weight, light stable polyamides is dependent on reacting the particular diamines and esters of dicarbothiolic acids herein described.

The polyamides of this invention are obtained by mixing, in approximately equimolar amounts, the diamine with the ester of dicarbothiolic acid and heating the mixture under conditions which permit the escape of volatile reaction products, until the polymer formed has an inherent viscosity of at least 0.75. Instead of using equimolar amounts of diamine and ester of dicarbothiolic acid, an excess of one or the other of these reactants may be used. The reactant used in excess functions as a viscosity stabilizer and by judicious selection of the excess, a polymer of almost any inherent viscosity may be made.

A convenient way of preparing the polyamides of this invention is by heating the diamine and ester of a dicarbothiolic acid to reaction temperature in the absence of a solvent under conditions which permit removal of volatile reaction products, until examination of a test portion shows that the polyamide has an inherent viscosity of at least 0.75. It is generally desirable to subject the polyamide to reduced pressure, e. g., an absolute pressure equivalent to 2 to 300 mm. of mercury, before using it in making filaments or other shaped objects. This is conveniently done by evacuating the reaction vessel in which the polyamide is prepared, before allowing the polymer to solidify.

Another convenient method is by heating the mixture of diamine and dicarbothiolic acid ester in an inert organic solvent for the polymer. With the solvent may be associated, if desired, non-solvents. When the reaction has proceeded to a point where the polymer has an inherent viscosity of at least 0.75, the mixture can be removed from the reactor and used as such or the polymer can be separated from the solvent by drowning in a non-solvent or by removing the solvent by distillation, preferably under reduced pressure.

The following examples wherein all proportions are by weight unless otherwise stated, illustrate specific embodiments of the invention.

*Example 1*

A charge consisting of 13.87 parts of 1,1,6,6-tetramethyl-1,6-diaminohexane and 31.12 parts of diphenyldithiol-sebacate, was placed in a glass tube. The glass tube was swept with oxygen-free nitrogen, evacuated, and then sealed. The charged, sealed tube was placed in a heated metal bath and the heating controlled so that the temperature rose from 100° C. to 220° C. in 25 minutes, where it was held for one hour. The tube was opened and heated for 15 minutes at 286° C. under one atmosphere pressure. The pressure was reduced to 3–4 mm. and the heating continued at 286° C. for 30 minutes longer. There was obtained 26 parts of polymer having an inherent viscosity of 0.88. A film pressed at 195° C. was clear and tough and could be cold drawn three fold. It had a tensile strength of 5500 p. s. i. and an elongation of 58%.

In contrast, a polyamide prepared from 1,1,6,6-tetramethyl-1,6-diaminohexane and diphenylsebacate under comparable conditions gave a clear brittle polymer having an inherent viscosity of 0.23.

Example II

A charge consisting of 23.47 parts of 1,1,6,6-tetramethyl-1,6-diaminohexane and 52.64 parts of diphenyldithiolsebacate was placed in a glass tube, along with 16 parts of purified p-xylene. The tube was swept with oxygen-free nitrogen, evacuated, and sealed. The sealed tube was heated in 30 minutes from 150° C. to 190° C. and the temperature held at 190° C. for three hours. The tube was then opened and heated for 0.75 hour at 255° C., under one atmosphere pressure. The pressure was then reduced to 3–4 mm. and the heating at 255° C. continued for an additional hour. The polymer obtained was clear, tough, and had an inherent viscosity of 1.46. Films pressed at 195° C. were clear, tough, and had a tensile strength of 7200 p. s. i.

Example III

A charge consisting of 19.83 parts of 1,1,6,6-tetramethyl-1,6-diaminohexane, 44.49 parts of diphenyldithiolsebacate, and 16 parts of purified p-xylene was placed in a glass tube. The tube was swept with oxygen-free nitrogen, evacuated, and sealed. The charged, sealed tube was heated from 150° C. to 210° C. in 30 minutes and held at 210° C. for an hour. It was then opened and heated for 30 minutes at 255° C. under one atmosphere pressure. The pressure was thereafter reduced to 3–4 mm. and the heating at 255° C. continued for an additional 30 minutes. There was obtained 35 parts of a polymer having an inherent viscosity of 1.28 and which was clear and tough. Residual thiophenol was removed from the polymer by dissolving it in 550 parts of boiling dimethylformamide and precipitating by pouring the dimethylformamide solution into a large volume of concentrated aqueous ammonia. After washing with water and drying at 100° C., the polymer had an inherent viscosity of 1.31. A film of the purified polymer was still tough after 200 hours exposure to ultraviolet light and the polymer had an inherent viscosity of 1.28.

In contrast to the above, a film from a polyhexamethyleneadipamide having an inherent viscosity 0.85, exposed at the same time, was brittle after 200 hours and the inherent viscosity was 0.72.

Example IV

A charge consisting of 21.38 parts of 1,1,6,6-tetramethyl-1,6-diaminohexane, 44.48 parts of diphenyldithiolsuberate, and 16 parts of purified p-xylene, was placed in a tube. The tube was swept with oxygen-free nitrogen, evacuated, and sealed. The charged, sealed tube was heated for 30 minutes at 150° C. The temperature was thereafter raised to 200° C. over a 30-minute period and held at 200° C. for one hour. The tube was opened and heated for 30 minutes at 255° C. under one atmosphere pressure. The pressure was then reduced to 3–4 mm. and the heating continued at 255° C. for an additional 30 minutes. There was obtained 36.5 parts of a tough polymer having an inherent viscosity of 1.20. Films pressed at 180° C. were tough, clear, and orientable.

Example V

A charge consisting of 20.18 parts of 1,1,6,6-tetramethyl-1,6-diaminohexane, 37.06 parts of diphenyldithiolglutarate, and 16 parts of purified p-xylene, was placed in a tube. The tube was swept with oxygen-free nitrogen, evacuated, and sealed. The charged, sealed tube was heated for 30 minutes at 150° C. The temperature was raised to 200° C. over 30 minutes and held at 200° C. for one hour. The tube was opened and heated for 30 minutes at 255° C. under one atmosphere pressure. The pressure was then reduced to 3–4 mm. and the heating at 255° C. continued for an additional 30 minutes. There was obtained 19 parts of polymer having an inherent viscosity of 0.99.

The 1,1,6,6-tetramethyl-1,6-diaminohexane used in the above examples was made by catalytically hydrogenating 2,7-dinitro-2,7-dimethyloctane in methanol solution, using palladium-on-carbon as a catalyst at 25° C. to 50° C. The diamine boils at 105° C./15 mm.

Example VI

A charge consisting of 88.29 parts of 1,8-diamino-p-menthane and 200.4 parts of diphenyl dithiolsebacate, was placed in a glass tube and the tube evacuated and sealed. The charged, sealed tube was placed in a heated metal bath and the heating controlled so that the temperature rose from 150° C. to 200° C. in 10 minutes, where it was held for one hour. The tube was then opened and heated for 45 minutes at 255° C. under 1 atmosphere pressure. The pressure was then reduced to 3 to 4 mm. and the heating continued at 255° C. for 30 minutes longer. There was obtained 160 parts of polymer. Residual thiophenol was removed from the polymer by dissolving it in 2840 parts of boiling dimethyl formamide. The resulting solution was poured into a large volume of concentrated aqueous ammonia with good stirring. The polymer which precipitated was washed five times with water and the washed product dried. There was obtained 148 parts of polymer having an inherent viscosity of 1.39.

1,8-diamino-p-menthane has the formula:

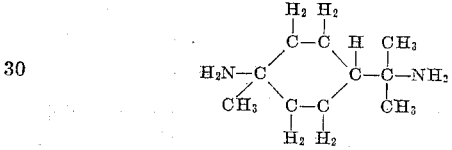

In this compound, the tetraalkyl substitution on the alpha, alpha' carbons consists of three methyl groups and the saturated aliphatic bridging group, —CH$_2$—CH$_2$—.

It will be understood that the above examples are merely illustrative and that the present invention broadly comprises new polyamides having an inherent viscosity of at least 0.75 and being the condensation products of alpha,alpha'-tetraalkyl-substituted diamines containing at least one hydrogen on each amino group and esters of dicarbothiolic acids in which the carbothiolic acid groups are separated by a chain of 3 to 10 carbons, inclusive, and the process of preparing such polyamides by reacting the above characterized diamines and esters at a temperature of 50° C. to 325° C. until a polyamide having an inherent viscosity of at least 0.75 is formed.

An important factor in this invention is the selection of the diamine to be used. It must be an alpha,alpha'-tetraalkyl-substituted diamine and it must contain at least one hydrogen on each amino group. The alkyl substitution can be a bridging group as in Example VI, providing the bridging group is saturated and aliphatic. Specific diamines particularly useful in this invention are, in addition to those of the examples, 1,1,6,6-tetraisobutyl-1,6-diaminohexane, 1,1,8,8-tetrahexyl - 1,8 - diaminooctane, 1,1,10,10-tetraethyl - 1,10 - diaminodecane, 1,1,6,6-tetradecyl - 1,6-diaminohexane, 1,4-bis(2,2-dimethyl-2-aminoethyl)cyclohexane, 1,4 - bis(2,2-dimethyl-2-aminoethyl) benzene, and 1,1,4,4-tetramethyl-1,4-diaminobutane.

The preferred diamines are those in which the alkyl groups are short-chained, i. e., contain less than seven carbon atoms, because of their availability and reactivity. The above diamines are conveniently made by hydrogenation of the corresponding tetraalkyl-substituted dinitro paraffins in solution at 25° C. to 50° C. using palladium-on-carbon as the catalyst.

The type of thiol ester used in the invention is likewise important. It must be an ester of a dicarbothiolic acid in which the carbothiolic groups are separated by a chain of 3 to 10 carbons, inclusive. A number of specific thiol esters are shown in the examples. Other specific esters of dicarbothiolic acids particularly suited for use in the invention include dimethyl dithioglutarate, diethyl dithioladipate, diamyl dithiolpimelate, dibenzyl dithiolsuberate, di-tert. butyl dithiolterephthalate, and the like.

The thiol esters herein considered are readily obtained by reacting at room temperature 1 mole of the acid chloride with 2 moles of the corresponding mercaptan in benzene solution in the presence of 2 moles of an acid acceptor, e. g., pyridine. The resulting esters can be purified by crystallization from a solvent, such as methanol, distillation or other methods well known to those skilled in the art.

In general, the reaction of this invention is conducted at temperatures in the range of 50° C. to 325° C. The range most commonly employed is from 200° C. to 275° C. because this embraces the conditions leading to good reaction rates with formation of products in the desired molecular weight range.

The reaction can be carried out by simply mixing the dry reactants and heating (fusion method) or it can be conducted in the presence of an inert reaction medium, e. g., xylene. In either method conditions are used which permit escape of volatile reaction products.

The polyamides of this invention by virtue of their high resistance to light degradation are espcially useful where light stability is a prime requirement, for example, in awnings, flexible auto top decking, tents, tobacco shade cloth, and the like. In film form, they are highly advantageous for use as coverings and such articles where light stability is highly important.

As many apparently widely different embodiments of this invention may be made without departing from the spirit and scope thereof, it is to be understood that the invention is not limited to the specific embodiments thereof except as defined in the appended claims.

The invention claimed is:

1. A high molecular weight, light stable polyamide having an inherent viscosity of at least 0.75 and being the condensation product obtained by reacting at a temperature of 50° C. to 325° C. approximately equimolar amounts of an alpha,alpha'-tetraalkyl-substituted diamine containing at least one hydrogen on each amino group and an organic dicarbothiolate selected from the group consisting of diaryl and dialkyl esters of a dicarbothiolic acid in which the carbothiolic acid groups are separated by a chain of 3 to 10 carbons, inclusive.

2. A polyamide as set forth in claim 1 wherein said diamine is one in which the alkyl groups contain less than 7 carbons.

3. A polyamide as set forth in claim 1 wherein said diamine is 1,1,6,6-tetramethyl-1,6-diaminohexane.

4. Process of preparing a polyamide which comprises reacting an alpha,alpha'-tetraalkyl-substituted diamine containing at least one hydrogen on each amino group and an organic dicarbothiolate selected from the group consisting of diaryl and dialkyl esters of a dicarbothiolic acid in which the carbothiolic acid groups are separated by a chain of 3 to 10 carbons, inclusive, at a temperature of 50° C. to 325° C. until a polyamide having an inherent viscosity of at least 0.75 is formed.

5. Process as set forth in claim 4 wherein said reaction is carried out at a temperature of 200° C. to 275° C.

6. A process as defined in claim 4 wherein said diamine is one in which the alkyl groups contain less than 7 carbons.

7. A process as defined in claim 4 wherein said diamine is 1,1,6,6-tetramethyl-1,6-diaminohexane.

8. A process as defined in claim 4 wherein said dicarbothiolate is the diphenyl ester of a dicarbothiolic acid.

9. A process as defined in claim 4 wherein said diamine is 1,1,6,6-tetramethyl-1,6-diaminohexane and said dicarbothiolate is the diphenyl ester of a dicarbothiolic acid.

References Cited in the file of this patent

UNITED STATES PATENTS

| | | |
|---|---|---|
| 2,071,250 | Carothers | Feb. 16, 1937 |
| 2,130,948 | Carothers | Sept. 20, 1938 |
| 2,628,218 | Magat | Feb. 10, 1953 |

FOREIGN PATENTS

| | | |
|---|---|---|
| 894,415 | France | Mar. 13, 1944 |